United States Patent [19]

Peifer et al.

[11] 4,359,882
[45] Nov. 23, 1982

[54] PORTABLE, SELF-STORING CONSOLE PROTECTION STRUCTURE

[75] Inventors: Gary S. Peifer, Waynesville; Virgil H. Johnson, Decatur, both of Ill.

[73] Assignee: Caterpillar Tractor Co., Peoria, Ill.

[21] Appl. No.: 261,106

[22] Filed: Oct. 31, 1980

[51] Int. Cl.³ .................... B65D 55/14; B60K 37/00
[52] U.S. Cl. ............................. 70/168; 70/160; 180/90; 296/70
[58] Field of Search .................. 70/159–179, 70/232; 73/432 AD; 180/90, 287; 296/70

[56] References Cited

U.S. PATENT DOCUMENTS

| | | | |
|---|---|---|---|
| 1,774,307 | 8/1930 | Willig | 70/168 |
| 2,181,828 | 11/1939 | Ingwer et al. | 70/232 X |
| 2,655,806 | 10/1953 | Stiler | 70/232 |
| 3,557,897 | 1/1971 | Conner et al. | 180/90 |
| 3,583,519 | 6/1971 | Meyer et al. | 180/90 |
| 3,913,701 | 10/1975 | Williams | 180/90 |
| 4,253,537 | 3/1981 | Intveld | 180/90 |

*Primary Examiner*—William E. Lyddane
*Attorney, Agent, or Firm*—Joseph W. Keen

[57] ABSTRACT

Multiple, interconnected shielding portions (26,28,30) constitute a protection structure (22) which may be arranged relative to a console (10) in an obstructing position so as to shield instruments contained in the console (10) from damage. The multiple shielding portions (26,28,30) are relatively displaceable to permit common occupation of all the shielding portions (26,28,30) in an envelope formed by one of the shielding portions (26). Such common occupation or self-storing design permits the protection structure (22), when removed from the console (10), to be stored in a minimum of space. The protection structure (22) may be assembled in obstructing relationship with the console (10) by displacing the individual shielding portions (26,28,30) to predetermined positions prior to interconnecting the console (10) and one of the components (28) with tabs (38) connected to the component (28) into slots in the console (10). Such interconnection obtains from pivoting the shielding components (26,28,30) simultaneously with inserting the tabs (38) in the slots. At the end of such pivoting movement, a lock (36) disposed on a different shielding portion (26) is engageable with the console to prevent unauthorized pivoting and removal thereof.

8 Claims, 4 Drawing Figures

Fig_1.

Fig-3-

PORTABLE, SELF-STORING CONSOLE PROTECTION STRUCTURE

DESCRIPTION

1. Technical Field

This invention relates generally to apparatus' instrument consoles and, more particularly, to a protection structure for shielding such instrument consoles.

2. Background Art

Off the road and other industrial vehicles are often parked in remote areas when they are not in use. Many of such vehicles do not provide operator compartments having lock mechanisms and are thus completely accessible. Such vehicles are often subjected to vandalism such as breaking of intruments, gauges, switches, etc. Repair of such instruments is costly, time consuming, and results in nonproductive vehicle downtime since the vehicles often cannot be safely operated without those instruments.

Instrument console guards have been developed and are often effective in protecting the console when they are employed. Such guards or covers are usually effective in resisting destructive blows to the instrument console. The most commonly used protective guard constitutes one or more members which can be folded or otherwise inserted into or about the instrument console. Providing instrument consoles with such integral or attached protective guards enables ready access to the instrument console by the operator upon removal of a locking device for securing the protective guard in its protective, obstructing position relative to the instrument console. Examples of such integral or permanently attached protective guards are illustrated in U.S. Pat. Nos. 3,841,431, 4,112,718, 3,452,835, 3,814,205, 3,557,897, and 3,913,701. The aforementioned patents respectively issued Oct. 15, 1974, Sept. 12, 1978, July 1, 1969, June 4, 1974, Jan. 16, 1971, and Oct. 21, 1975. The protective guards which are the subject of the aforementioned U.S. patents may be concealed within or fastened adjacent the instrument consoles. While such protective guards admirably perform the protective service for which they were designed, a relatively more complex and expensive instrument console must be developed to accommodate them. Also, in cases where the protective guard sustains damage, removal of the damaged guard and installation of a replacement guard is time consuming and expensive since it results in downtime of the utilizing apparatus just as damage to the instrument console would. However, providing a portable instrument console protection guard which is amendable to removal and reinstallation on various vehicles presents a storage problem since such protection guards are typically of rather bulky size and, for convenience sake, must be stored within the relatively small confines of an operator compartment.

The present invention is directed toward solving one or more of the prior art console guard's disadvantages. Namely, it was determined that a desirable instrument console protection guard would have the features of portability, compact design, convenient storage, and permit the use of an instrument console of relatively inexpensive design.

DISCLOSURE OF THE INVENTION

In one aspect of the present invention, a portable instrument console protection structure is provided which includes at least two pivotally joined shielding portions which, when arranged in the desired relative positions in closely spaced relation with an instrument console, obstruct access and thus prevent damage to the instrument console. Due to their pivotal interconnection, at least one shielding portion may be relatively pivoted and configured within another shielding portion such that when the shielding portions are not in their functionally obstructing positions relative to the instrument console, they are self-storing in a compact envelope which is amenable to storage. The present invention also has provisions for interconnecting the individual shielding portions with the instrument console when the shielding portions are in closely spaced obstructing positions relative to the instrument console so as to prevent the unauthorized removal of the protection structure, as a whole, from the instrument console.

BRIEF DESCRIPTION OF THE DRAWINGS

The objects and advantages of the present invention will become more apparent from reading the following detailed description in connection with the accompanying drawings, in which.

BEST MODE FOR CARRYING OUT THE INVENTION

Figure 1:
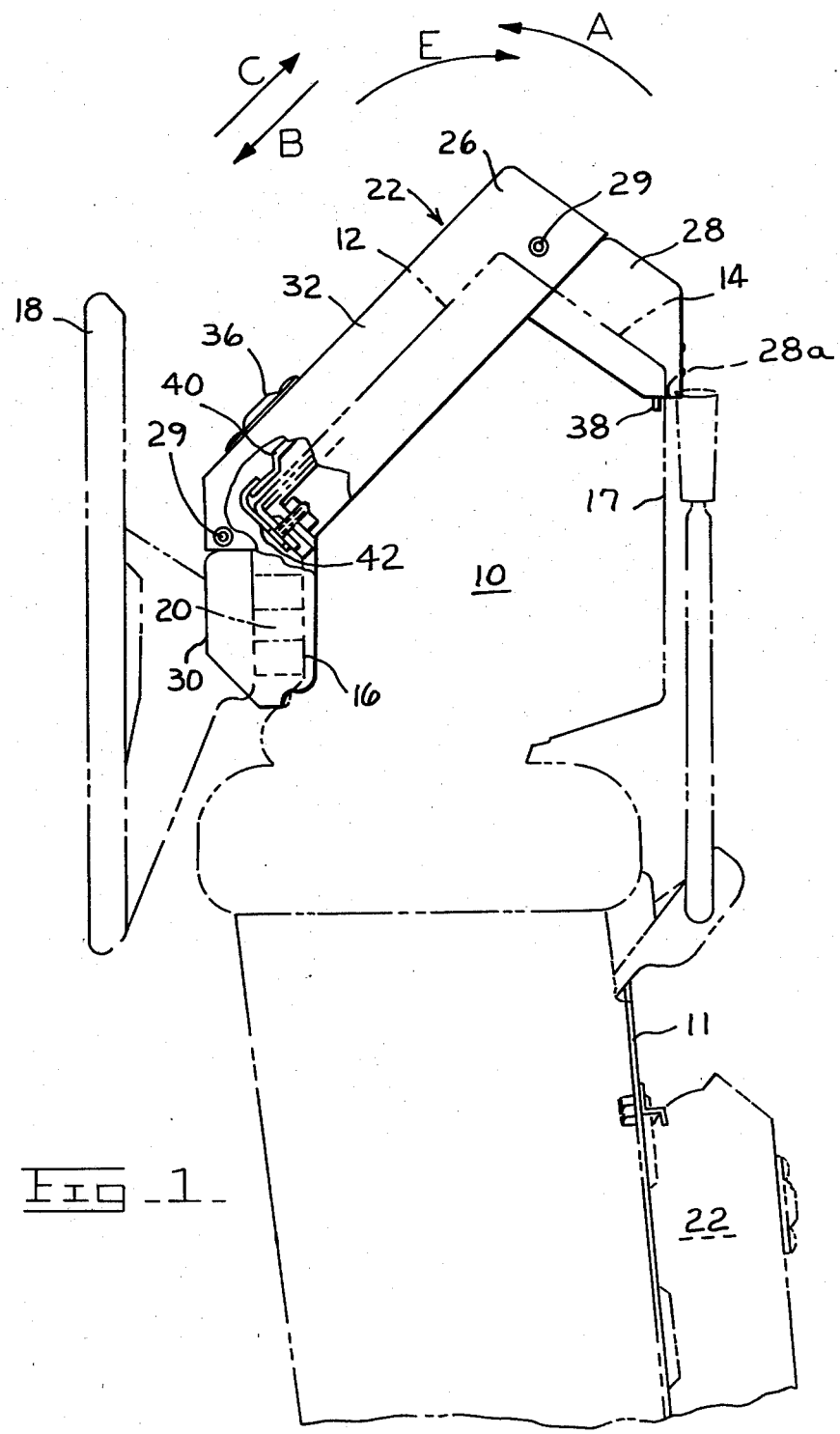
FIG. 1 is a side elevational view of the present invention installed on an exemplary instrument console.

Referring now to the drawings in detail, a subject instrument console 10 which is supported by a support leg 11 has a central console face 2, a first console face 14, a second console face 16, and a third console face 17. A steering wheel 18 is connected to a steering valve (not shown) through a steering shaft 20. While the present invention may be utilized with any mateable instrument console, the exemplary instrument console 10 is arranged, by example, in a motor grader. The instrument console faces 12, 14, and 16 all have either gauges, switches, and/or other instruments which are susceptible to damage. In order to protect the faces of the instrument console 10 from vandalism during nonuse of the motor grader, a self-storing, portable instrument console protection structure 22 is provided.

The console protection structure 22 preferably includes a central shielding portion 26, a first extensible shielding portion 28 which is pivotally connected at a hinge 29 to the central shielding portion 26, a second extensible shielding portion 30 which is pivotally connected at a hinge 29 to the central shielding portion 26, and means 32 which include a lock 36 and a pair of bent tabs 38 for engaging with the central and third console faces 12 and 17 respectively. The tabs 38 are connected to a swingable end 28a of the first extensible shielding portion and are insertable in slots (not shown) in the third console face 17. The lock 36 is joined to the central shielding portion 26 and is activatable with a key or other security device. A locking lever 40 which is connected to the lock 36 is rotatable into engagement with a locking bracket 42 which is joined to and constitutes a part of instrument console 10. The second extensible shielding portion 30 is arranged in FIG. 1 in obstructing relation with the second console face 16. Each of the hinges 29 preferably constitutes a rivet or threaded fastener.

Figure 2:
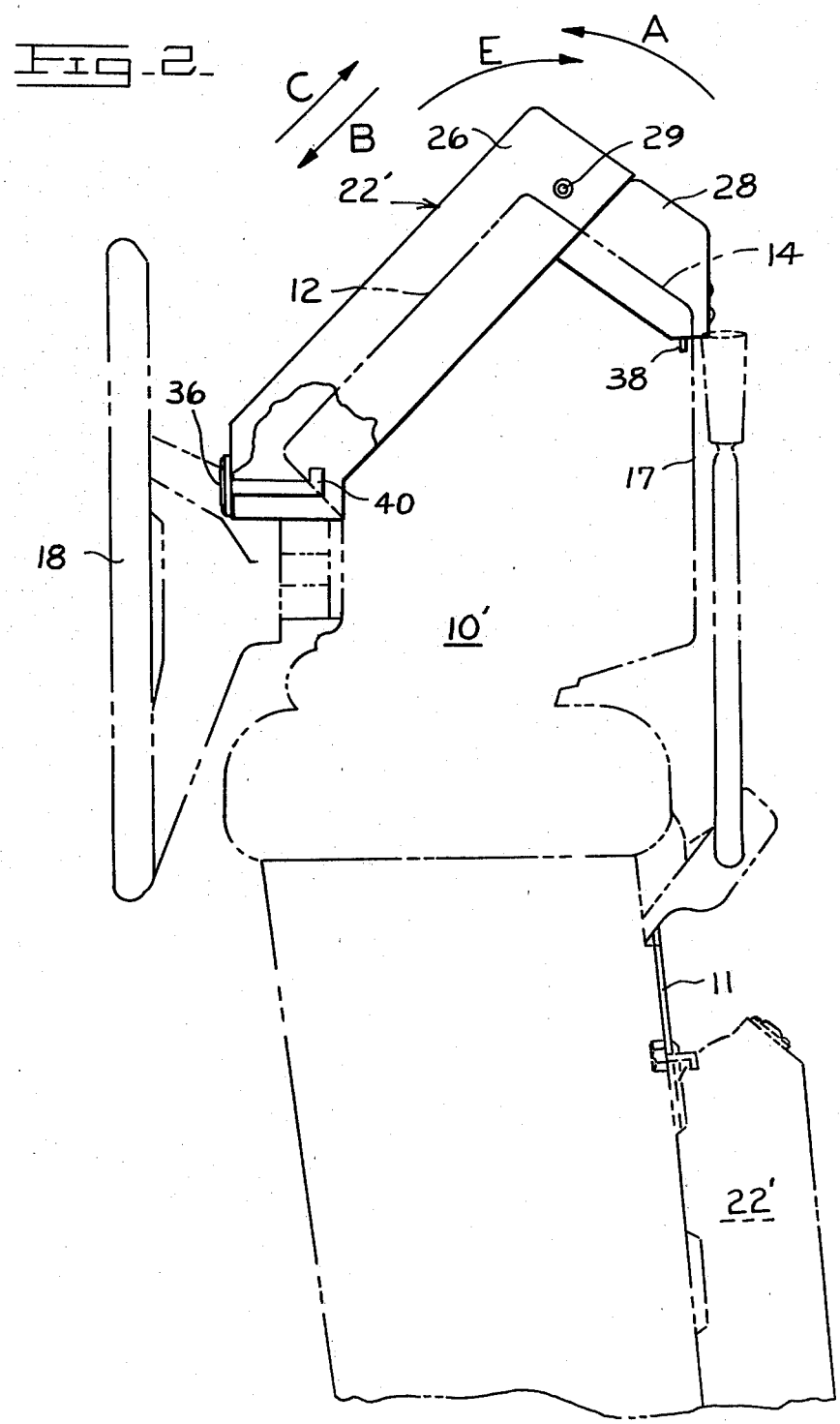
FIG. 2 is a side elevational view of an alternate embodiment of the present invention installed on an instrument console similar to, but of a different shape than the console illustrated in FIG. 1.

An alternate console protection structure 22' is illustrated in FIG. 2 and includes a central shielding portion 26, a first extensible shielding portion 28 which is pivotally connected to the central shielding portion 26 by a pair of hinges 29, a pair of bent tabs 38 which are connected to the first extensible shielding portion 28 and are insertible in slots disposed in an instrument console 10', and a lock 36 having a rotatable locking lever 40 which enages a slot (not shown) in the instrument console 10'. The console protection structure 22 illustrated in FIG. 1 has one additional extensible shielding portion 30 which serves to cover the second console face portion 16. Presently, instruments, gauges, switches, etc. are disposed on the three console faces 12, 14, and 16 and thus require protection during hours when the utilizing vehicle is unattended. However, if and when the instrument console 10 of FIG. 1 is altered to that of 10' where all instruments, gauges, switches, etc. are eliminated from the second console face 16, the alternate console protection structure 22' could be utilized while still obtaining all the advantages of the console protection structure 22.

Figure 3:
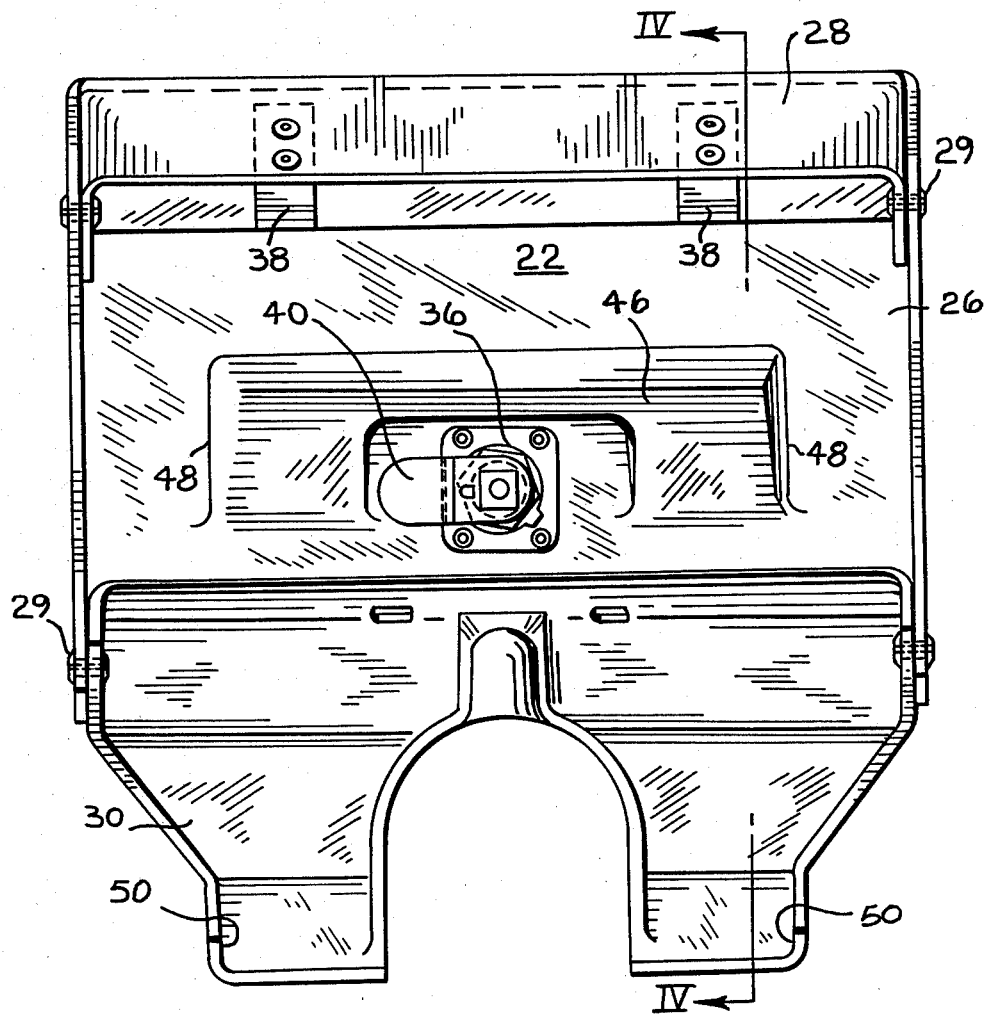
FIG. 3 is a front elevational view of the present invention illustrated in FIG. 1.
Figure 4:
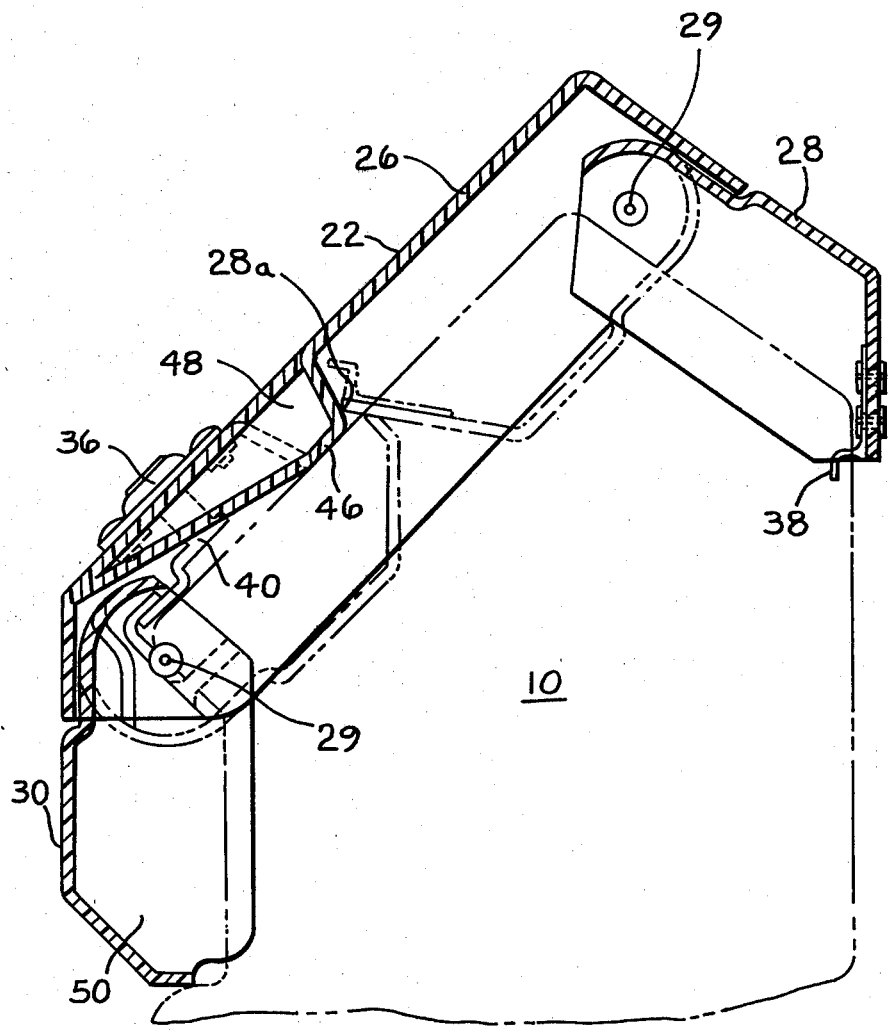
FIG. 4 is an enlarged sectional view taken along line IV—IV of FIG. 3.

The protection structure illustrated in FIGS. 3 and 4 constitute the protection structure 22, but it is to be understood that the alternate console protection structure 22' would appear the same as those of FIGS. 3 and 4 except that the second extensible shielding portion 30 would be deleted. FIG. 4 illustrates the console protection structure 22 disposed in its operating, obstructing configuration (in full lines) and its retracted, storage configuration (in phantom lines). An inward protrusion 46 of the central shielding portion 26 extends inwardly toward the central console face 12 when the console protection structure 22 is arranged in its obstructing configuration. The swingable end 28a of the first extensible shielding portion 28 is, when moved to its retracted position, frictionally engageable with the inward protrusion 46 so as to secure the first extensible shielding portion 28 in its retracted position. A first and a second pair of retention surfaces 48 and 50 are respectively disposed on the central shielding portion 26 and the second extensible shielding portion 30. Such retention surfaces 48 and 50 are best illustrated in FIG. 3. When the second extensible shielding portion 30 is retracted to its nonobstructing, storage position as illustrated in phantom in FIG. 4, the retention surfaces 50 mounted thereon frictionally engage the retention surfaces 48 mounted on the central shielding portion 26 so as to secure the second extensible shielding portion 30 in its retracted position. When the first and second extensible shielding portions 28 and 30 are disposed in their retracted positions, the second extensible shielding portion 30 overlaps the first extensible shielding portion 28 so as to obstruct pivotal movement thereof and provide additional force for retaining shielding portion 28 in its retracted position.

INDUSTRIAL APPLICABILITY

The instrument console protection structures 22 and 22' may be respectively mounted on the instrument consoles 10 and 10' in an obstructing configuration (as illustrated in FIGS. 1 and 2) or, the shielding portions 28 and 30 thereof may be pivotally retracted so as to permit the shielding portion 26 to house the shielding portions 28 and 30 in the case of protection structure 22 and to house the shielding portion 28 in the case of protection structure 22'. Such retractive, self-storing structure provides a compact envelope which is conveniently stored in an operator compartment within which the instrument console 10 or 10' is arranged. Typical stored positions for such protection structures 22 and 22' are illustrated in phantom in FIGS. 1 and 2, respectively, along the support leg 11c of the instrument consoles 10 and 10' respectively. The protection structures 22 and 22', when arranged in the retracted, self-storing configurations along the support leg 11a of the instrument consoles 10 and 10' respectively, are illustrated in phantom lines to indicate that such protection structures 22 and 22' are only stored in those positions when they are not arranged in the illustrated obstructing configurations.

When it is desired to arrange the console protection structure 22 or 22' in its obstructing configuration, the first extensible shielding portion 28 is pivoted relative to the central shielding portion 26 until the desired angle therebetween is attained. In the case of the console protection structure 22, the second extensible shielding portion 30 is likewise pivoted relative to the central shielding portion 26 until the appropriate angle therebetween is attained. Thereafter the bent tabs 38 are first inserted in the slots in the console 10 or 10', as appropriate, and the entire instrument console protection structure 22 or 22' is pivoted relative to the console 10 or 10' until the central shielding portion 26 achieves an obstructing position in closely spaced relation with the console's central face portion 12. In the case of pivotal movement of the protection structure 22, the second extensible shielding portion 30 is arranged in an obstructing position with the second face 16 of the console 10. Lock 36 is then rotated to engage the locking lever 40 with the console bracket 42.

The pivoting motion for disposing the console protection structures 22 and 22' in their obstructing configuration is generally in a counterclockwise direction as indicated by the reference direction character A. The bent tabs 38 resist movement of the protection structure 22 and 22' in the direction generally indicated as B. The second extensible shielding portion 30 resists movement of the protection structure 22 in the direction generally indicated as C by abuttable engagement of the shielding portion 30 with the locking bracket 42 of the instrument console 10. The locking lever 40, when rotated into engagement with the bracket 42, prevents pivoting of the protection structure 22 in the direction generally indicated as E which is opposite that of A. The lock 36 for the alternate console protection structure 22' is disposed in a different location so as to simultaneously resist movement of the protection structure 22' in the C direction as well as prevent pivoting thereof in the E or clockwise direction.

It is to be again emphasized that while the console protection structure 22 is preferable since three faces of the console 10 presently require protection, protection structure 22' is considered within the purview of the present invention even though it has one less extensible shielding portion 30. As can be better seen in FIG. 4, the first and second extensible shielding portions 28 and 30 will not pivot appreciably beyond their desired obstructing positions relative to the central shielding portion 26 since further rotation thereof in the A and E directions, respectively, will result in interference with the central shielding portion 26. The first and second extensible shielding portions 28 and 30 are engageable in an overlapping relation when they are disposed in their retracted positions. The first extensible shielding portion 28 is preferably retracted prior to the second extensible shielding portion 30 which frictionally engages the retention surfaces 48 when retracted and obstructs movement of the shielding portion 28 from its retracted position in which it is engaged with the inward protrusion 46.

It should now be apparent that an improved instrument console protection structure 22 and 22' has been provided in which effective protection of multiple instrument console faces is attained through a relatively simple engagement procedure and a self-storing, portable envelope results from retracting the extensible shielding portions 28 and 30 into the outline formed by the central shielding portion 26. Such collapsible, self-storing feature of the protection structure 22 and 22' facilitate storage thereof near the instrument console to be protected. Moreover, the construction of the protection structures 22 and 22' provides means for releasably maintaining its shielding portions in the retracted configuration which enables easy handling and storage by the operator of the utilizing apparatus.

We claim:

1. A self-storing, portable instrument console protection structure (22,22') for shielding faces (12,14,16) of a console (10,10'), said protection structure (22,22') comprising:
   a central shielding portion (26) having first end and a second end, said central shielding portion (26) being disposable in a closely spaced obstructing position relative to a central console face (12) and being removable from the console (10,10') to any desired location;
   a first extensible shielding portion (28) being pivotally connected (29) to said central shielding portion's (26) first end to swing between a closely spaced obstructing position relative to a first console face (14) and a retracted position in which said first extensible shielding portion (28) is housed in said central shielding portion (26); and
   means (32) for selectively interconnecting said shielding portions (26,28) with said console (10,10') when said central (26) and first extensible shielding (28) portions occupy said obstructing positions.

2. The console protection structure (22,22') of claim 1 wherein said first extensible shielding portion (28) is engageable with said central shielding portion (26) when disposed in said retracted position to restrain movement of said first extensible shielding portion (28) from its housed configuration.

3. The protection structure (22) of claim 1 further comprising:
   a second extensible shielding portion (30) being pivotally connected (29) to said second end of said central shielding portion (26) to swing between a closely spaced obstructing position relative to a second console face (16) and a retracted position in which said second extensible shielding portion (30) is housed in said central shielding portion (26).

4. The console protection structure (22) of claim 3 wherein said first and second extensible shielding portions (28,30), when arranged in said retracted position, are mutually engageable to restrain movement thereof and maintain their housed configuration within said central shielding portion (26).

5. The console protection structure (22') of claim 1, said interconnecting means (32) comprising:
   a protruding tab (38) connected to said first extensible shielding portion (28), said tab (38) being engageable with the console (10,10') to resist movement of said first shielding portion (28) in a first direction (B), said tab (38) being disengageable from the console (10,10') when said tab (38) is moved in a second direction (C) which is opposed to said first direction (B); and
   a lock (36) for releasably attaching said central shielding portion (26) to the console (10,10'), said lock (36) resisting movement of said central shielding portion (26) in said second direction (C).

6. A self-storing, removable instrument console protection structure (22) for shielding faces (12,14,16) of a console (10), said protection structure (22) comprising:
   a central shielding portion (26) having a first end and a second end, said central shielding portion (26) being disposable in a closely spaced obstructing position relative to a central console face (12) and being removable from the console face (12) to any desired location;
   a first extensible shielding portion (28) being pivotally connected (29) to said first end of said central shielding portion (26) to swing between a closely spaced obstructing position relative to a first console face (14) and a retracted position in which said first extensible shielding portion (28) is housed in said central shielding portion (26);
   a second extensible shielding portion (30) being pivotally connected (29) to said second end of said central shielding portion (26) to swing between a closely spaced obstructing position relative to a second console face (16) and a retracted position in which said second extensible shielding portion (30) is housed in said central shielding portion (26); and
   means (32) for selectively interconnecting said shielding portions (26,28,30) with said console (10) when said central shielding portion (26) and said first (28) and second (30) extensible shielding portions occupy said obstructing positions.

7. The protection structure (22) of claim 6 further comprising:
   means (48,50) for retaining said first (28) and second (30) extensible shielding portions in said retracted positions, said retaining means (48,50) including a first retention surface (48) disposed on said central shielding portion (26); and
   a second retention surface (50) disposed on said retained extensible shielding portion (30), said first and second retention surfaces (48,50) being frictionally engageable when said retained extensible shielding portion (30) occupies said retracted position, movement of said first extensible shielding portion (28) from said retracted position to said obstructing position being impeded by said second extensible shielding portion (30) when said second extensible shielding portion (30) occupies said retracted position.

8. The protection structure (22) of claim 6, said interconnecting means (32) comprising:
   first means (38) for linking said first extensible shielding portion (28) to the console (10) when said shielding portions (26,28,30) are pivoted in a first direction (A) relative to the console (10) into said obstructing positions, said first linking means (38) preventing movement of said shielding portions (26,28,30) in a second direction (B) relative to the console (10);

second means (30) for linking said second extensible shielding portion (30) to the console (10) when said shielding portions (26,28,30) are pivoted relative to the console (10) into said obstructing positions, said second linking means (30) preventing movement of said shielding portions (26,28,30) in a third direction (C), opposite said second direction (B); and third means (36) for linking said central shielding portion (26) to the console (10) when said shielding portions (26,28,30) are pivoted in said first direction (A) relative to the console (10) into said obstructing positions, said third linking means (36) preventing pivoting movement of said shielding portions (26,28,30) relative to the console (10) in a direction (E) opposite that of said direction (A) to which the shielding portions (26,28,30) were pivoted into their obstructing positions.

* * * * *